United States Patent [19]

Lammers et al.

[11] Patent Number: 4,822,696
[45] Date of Patent: Apr. 18, 1989

[54] PROCESS FOR THE CONVERSION OF X-RAYS

[75] Inventors: Marinus J. Lammers, Nieuwegein; George Blasse, Bunnik, both of Netherlands; David R. Terrell, Lint; Leo B. Alaerts, Boechout, both of Belgium

[73] Assignee: Agfa-Gevaert N.V., Mortsel, Belgium

[21] Appl. No.: 81,756

[22] Filed: Aug. 5, 1987

[30] Foreign Application Priority Data

Aug. 29, 1986 [EP] European Pat. Off. ... EP 86201485.9

[51] Int. Cl.$^4$ ............................................. C09K 11/80
[52] U.S. Cl. .................................. 428/690; 250/483.1
[58] Field of Search ........................ 428/690, 691, 917; 250/483.1

[56] References Cited

U.S. PATENT DOCUMENTS 3,887,807 6/1975 Poignant, Jr. et al. ......... 430/953 X

Primary Examiner—Nancy A. B. Swisher
Attorney, Agent, or Firm—A. W. Breiner

[57] ABSTRACT

A process for the conversion of X-rays into blue and/or green light with a phosphor which on exposure to X-rays emits light the spectrum of which contains main intensity lines below 460 nm and/or main intensity lines between 530 and 570 nm, wherein said phosphor comprises a gadolinium gallium garnet compound having following empirical formula:

$$Gd_{8-x-y}Ln_yGa_xO_{12}$$

wherein: $5.14 \geq x \geq 4.90$ and $0.45 \geq y \geq 0.001$, and Ln is scandium (Sc) and/or one or more rare earth elements other than gadolinium.

The invention is directed particularly to the use of said phosphor in an X-ray conversion screen applied in medical radiography.

8 Claims, 5 Drawing Sheets

PROCESS FOR THE CONVERSION OF X-RAYS

The present invention relates to a process for the convention of X-rays into visible light.

It is well known that X-rays can cause appropriate substances to luminesce. Substances showing the phenomenon of luminescence under the influence of X-rays are commonly called phosphors.

For the production of radiographs in conjunction with photographic silver halide emulsion materials these phosphors are used in a supported or self-supporting binder layer forming an X-ray conversion screen.

The phosphors used in said screens should be luminescent but not exhibit appreciable long lived emission after the X-ray source is switched off. If a screen with marked-long lived emission were to be used, it would retain its image after the X-ray beam had ceased and a fresh film contacted with it would gain so-callaed ghost impression that would interfere with the next image to be made. This phenomenon is also known under the term "after-glow".

To be useful in medical X-ray diagnosis the phosphor used in an X-ray conversion screen also called intensifying screen should be capable of a bright and intensive emission to enable the operator to work with a low dose of X-rays not harmful to the patient.

For that purpose the phosphor must absorb X-rays effectively and must convert efficiently the absorbed X-ray radiation into visible or near visible light. Thus a practically useful phosphor should have both a high X-ray absorption capacity and a high X-ray conversion efficiency.

A survey of phosphors for use in medical X-ray conversion screens is given by A. L. N. Stevels in the bulletin Medica Mundi, 20, (1975) No. 1, p. 1–22.

There are thousands of phosphor materials that are luminescent upon absorbing cathode-rays (electron beam) or ultra-violet light, but such gives no indication about the conversion efficiency of X-rays into light.

From Japanese Patent No. 71-32,161 it is known that $Gd_3Ga_5O_{12}$ activated with Tb, Eu, Er, Sm and/or Tm is a phosphor that can be utilized in cathode-ray tubes or discharge lamps, but no indication has been given with respect to the use of said phosphor for the conversion of X-rays into visible light. Said gadolinium-gallium compound has substantially a garnet structure. The colour of the emitted light depends on the kind of rare earth metal dopant and their concentration. For the preparation of these phosphors the corresponding metal oxides are thoroughly mixed and air-calcinated at a temperature of 1400° C.

It is an object of the present invention to provide a process for the coversion of X-rays very efficiently into blue and/or green light without prohibitive after-glow using particular phosphors being activated gadolinium gallium garnet compounds.

It is another object of the present invention to use said phosphors in a binder layer of an X-ray conversion screen suitable for use in radiography with appropriately spectrally sensitized silver halide emulsion materials.

Other objects and advantages of the present invention will appear from the further description.

In accordance with the present invention there is provided a process for the conversion of X-rays into blue and/or green light with a phosphor which one exposure to X-rays emits light the spectrum of which contains main intensity lines below 478 nm and/or main intensity lines between 530 and 570 nm, characterized in that solid phosphor comprises a gadolinium gallium garnet compound having following empirical formula:

$$Gd_{8-x-y}Ln_yGa_xO_{12}$$

wherein : $5.14 \geq x \geq 4.90$ and $0.45 \geq y \geq 0.001$, and Ln is scandium (Sc) and/or one or more rare earth elements other than gadolinium.

The phosphor used according to the present invention consists preferably for at least 95 mole % of the stoichiometric gadolinium gallium garnet compound, the main impurities or by-products being unreacted gadolinium oxide and gallium oxide and mixed oxides thereof not having the garnet crystal structure. The garnet crystal structure is exemplified in Philips Techn. T. 41, No. 2 (1983), p. 35 as $Gd_3Fe_5O_{12}$ (gadolinium iron garnet) compound suited for use in magnetic bubble memory devices.

According to a preferred embodiment x is in the range $5.12 \geq x \geq 4.95$ and Ln is mainly (i.e. at least 50 atom % of the dopants) trivalent terbium. In the case of Ln being mainly $Tb^{3+}$ a high X-ray conversion into green light is obtained for y in the range $0.45 \geq y \geq 0.09$, and a high X-ray conversion into blue light is obtained for y in the range $0.09 \geq y \geq 0.001$.

A particularly high X-ray conversion into green light is obtained for Ln being $Tb^{3+}$ and having y and x values in the range $0.45 \geq y \geq 0.09$ and $5.12 \geq x \geq 4.96$ respectively.

The optimum X-ray conversion into visible light is obtained at a $Tb^{3+}$ concentration about 6 atom % with respect to the total gadolinium and terbium content.

The luminescence intensity of gadolinium-gallium garnet phosphors doped with terbium is on X-ray excitation comparable to commercial green light emitting $Gd_2O_2S:Tb$ phosphors.

The phosphors used in the X-ray conversion screens according to the present invention have a particularly good chemical stability and their emission power is practically not reduced by moisture and oxygen of the air.

The invention is illustrated by accompanying drawings in which.

Figure 5:
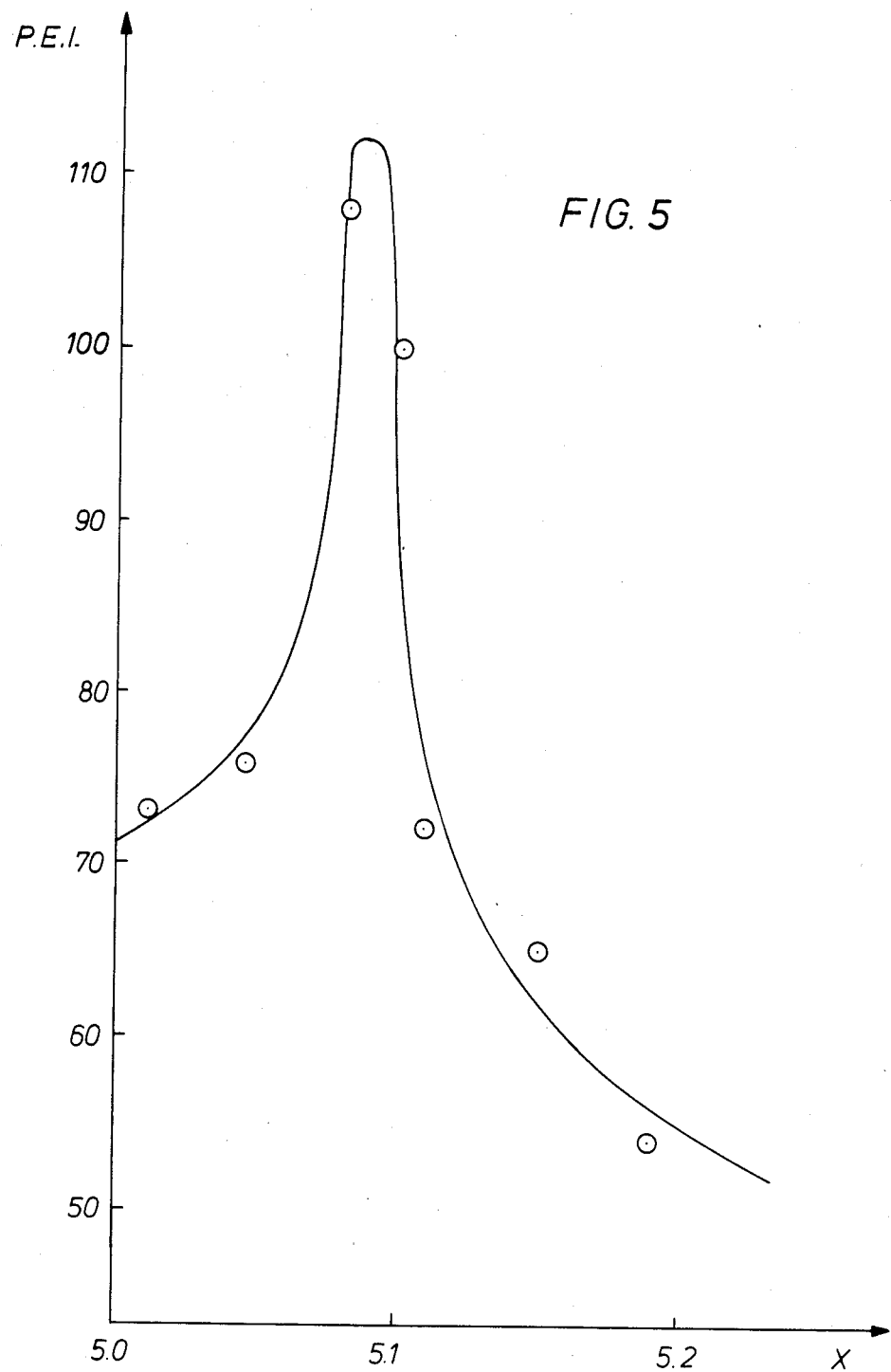

FIG. 5 represents a curve relating to the percentage emission intensity (P.E.I.) for the 542 nm emission band versus x value in Tb containing phosphors obtained according to Examples 1, 18, 19, 20, 21, 22 and 23. The emission value of the phosphor prepared according to Example 1 being arbitrarily given the value 100.

Figure 6:
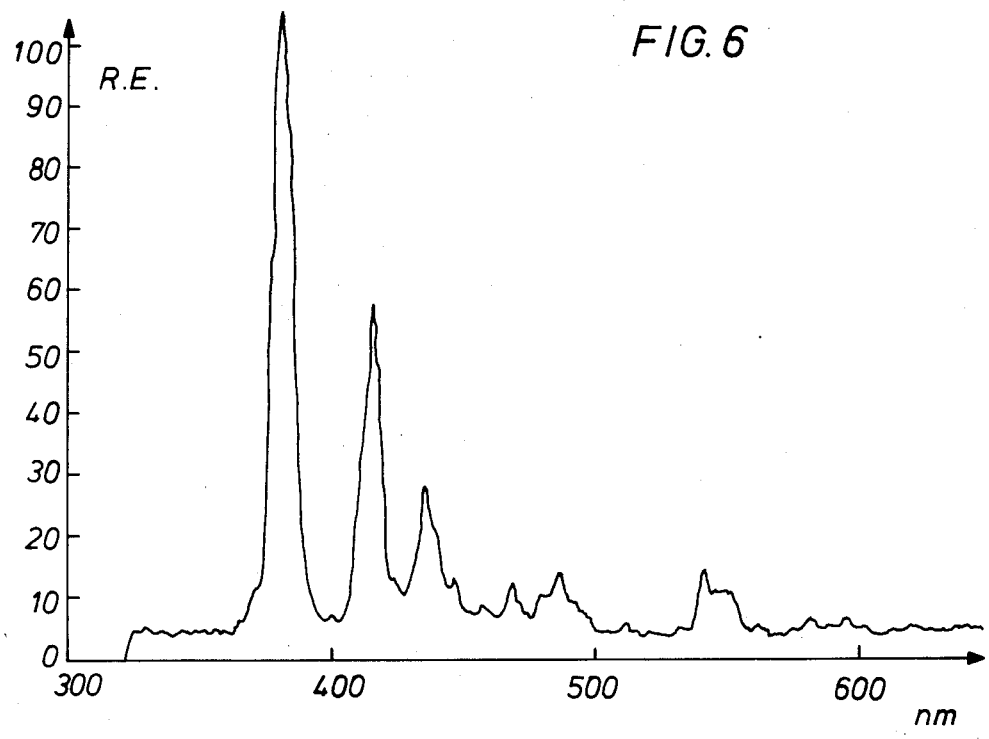

FIG. 6 represents the relative energy (R.E.) versus wavelength (nm) curve of light emitted by the phosphor prepared according to Example 24 when using X-ray excitation.

The preparation of phosphor compounds for use according to the present invention may proceed via dry or wet mixing techniques, with or without using a flux in the firing, with one or more firings at temperatures between about 600 and about 1,600 °C. in the presence of air or an inert atmosphere, e.g. consisting of nitrogen. The last firing may take place in a slightly reducing atmosphere to convert $Tb^{4+}$ into $Tb^{3+}$.

Efficient mixing of the ingredients is important. The ingredients being mixed may be in different forms. The activator or mixture of activators, also called dopants, may be introduced in various ways, e.g. as oxides, as coprecipitated oxalate, as coprecipitated hydroxides or as doped host metal oxide.

Gadolinium, one of the host metals may be introduced for example as a coprecipitated oxalate with the activator or activators, as gadolinium oxalate, as gadolinium hydroxide or as gadolinium oxide. Gallium may be introduced for example as gallium oxide, gallium oxyhydroxide, gallium hydroxide or gallium oxalate.

When starting with the metal oxides in the preparation of gadolinium-gallium garnet compound the mixing before firing proceeds preferably in the presence of an inert liquid, e.g. volatile watermiscible liquid such as ethanol, to form a slurry before firing.

The following four mixing techniques separately or combined are offering very satisfactory results :

(1) the coprecipitation of metal hydroxides using ammonium hydroxide and the corresponding metal nitrates or chlorides, (2) the mixing in slurry form of Tb-doped gadolinium oxalate or pyrolized gadolinium oxalate and GaOOH or $Ga_2O_3$, (3) the mixing in slurry form of $Gd_2O_3$, $Tb_4O_7$ and GaOOH or $Ga_2O_3$, or (4) the mixing of $Gd_2O_3$, $Tb_4O_7$ and GaOOH or $Ga_2O_3$ with flux compounds providing improved reactive contact during firing.

Preferred flux compounds for use in the firing(s) are $BaF_2$, $K_2SO_4$, $Na_2SO_4$, $Li_2SO_4$, $BaCl_2$, NaCl and LiF. Other fl compounds are $MgCl_2$, $NH_4Cl$, $GdF_3$, KCl, KBr, $AlF_3$, $YF_3$, $B_2O$ and $H_3BO_3$. Two or more of them may be used in combination.

Detailed preparation techniques are given hereinafter in Examples 1 to 24. Samples were checked on crystal structure by X-ray powder diffraction using Cu $K_\alpha$ radiation.

EXAMPLE 1

1.90186 g of gadolinium oxide, 1.84861 g of $Ga_2O_3$ and 0.12727 g of $Tb_4O_7$ were mixed for 10 min in a planetary ball-mill in the presence of 5 ml of ethanol. The mixture was fired in compressed state at 1550° C. in air for 3 hours in an aluminum oxide crucible in a tube furnace. The sample was heated up at a rate of 300 °C./h. After cooling the sample was ground in a mortar with pestle in the presence of ethanol.

The resulting phosphor having a density of 7.1 g/cm3 contained 6 atom % of terbium with respect to gadolinium and consisted as defined by X-ray diffraction spectrography (XRD) of 100% of adolinium gallium garnet having the formula $Gd_{2.72}Tb_{0.18}Ga_{5.10}O_{12}$.

Figure 1:
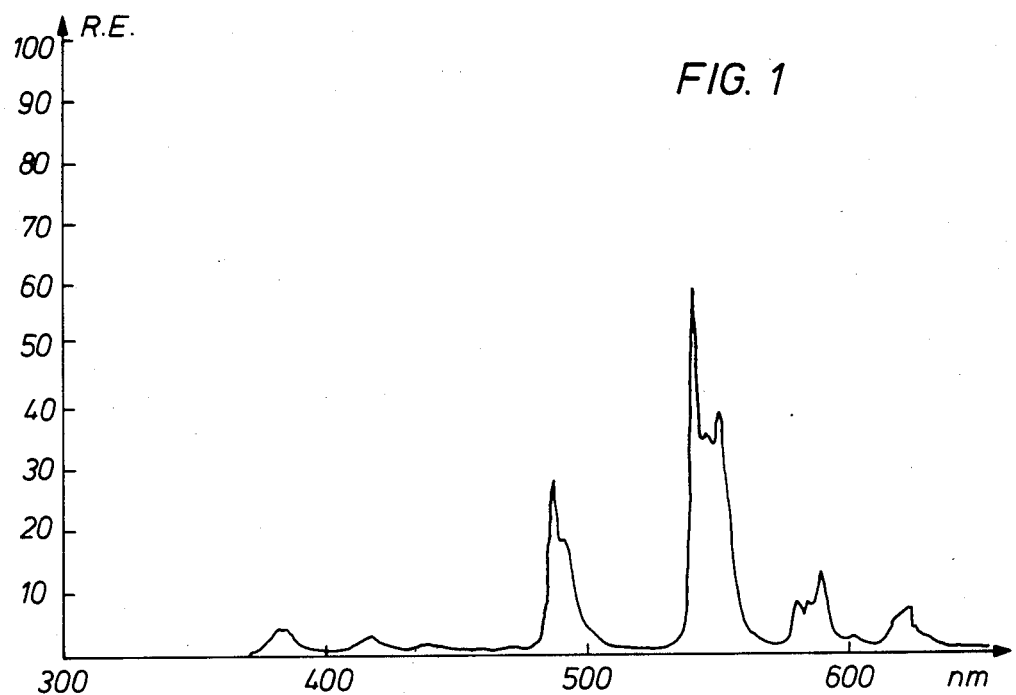
FIG. 1 represents the relative energy (R.E.) versus wavelength (nm) curve of light emitted by the phosphor prepared according to Example 1 when using X-ray excitation.

FIG. 1 represents the relative energy (R.E.) versus wavelength (nm) curve, of the phosphor prepared according to Example 1. The excitation proceeded with X-rays of 100 kV.

EXAMPLES 2 to 11

Following the procedure described in Example 1 phosphors of the above defined empirical formula, wherein Ln is Tb, x is 5.10, y is 0.003, 0.015, 0.029, 0.058, 0.087, 0.116, 0.203, 0.232, 0.290 and 0.435 respectively were prepared.

The percental emission intensities (P.E.I.) of the 542 nm band and for emission at wavelengths below Lambda 478 nm are indicated in the following Table 1 together with the $I_{383}$ nm:$I_{542}$ nm peak height ratio, which gives a measure for the relative emission intensities of the emission at wavelengths below 478 nm to that at 542 nm.

The 542 nm band emission intensity of the phosphor prepared according to Example 1 is arbitrarily given the value 100. For the emission at wavelengths Lambda <478 nm the phosphor prepared according to example 3 is arbitrarily given the value 100.

Figure 2:
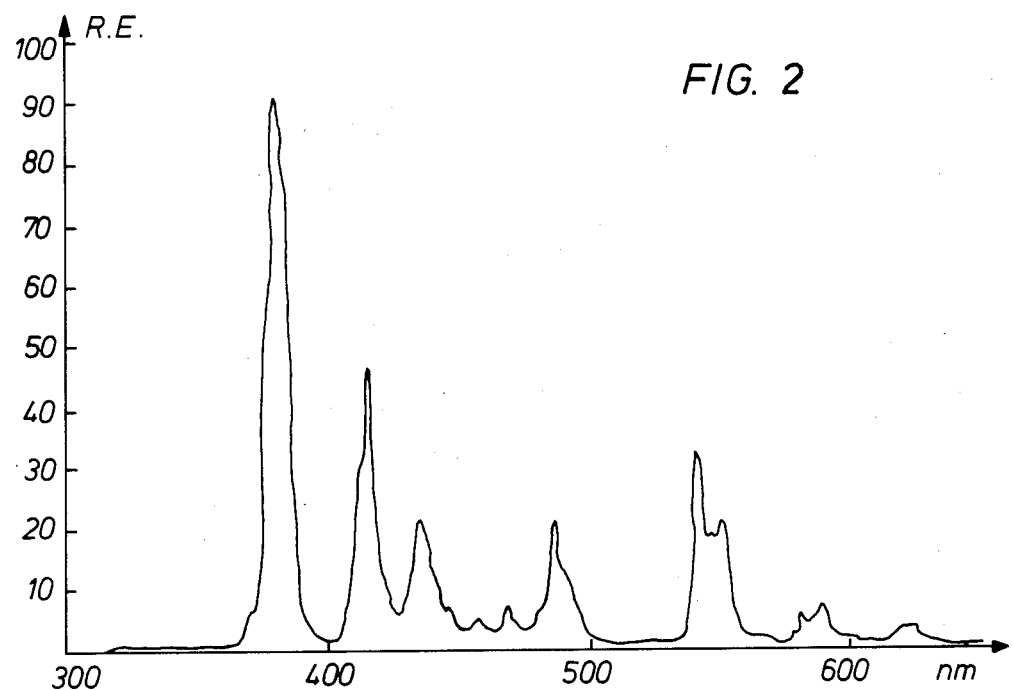
FIG. 2 represents the relative energy (R.E.) versus wavelength (nm) curve of light emitted by the phosphor prepared according to Example 3 when using X-ray excitation.
Figure 3:
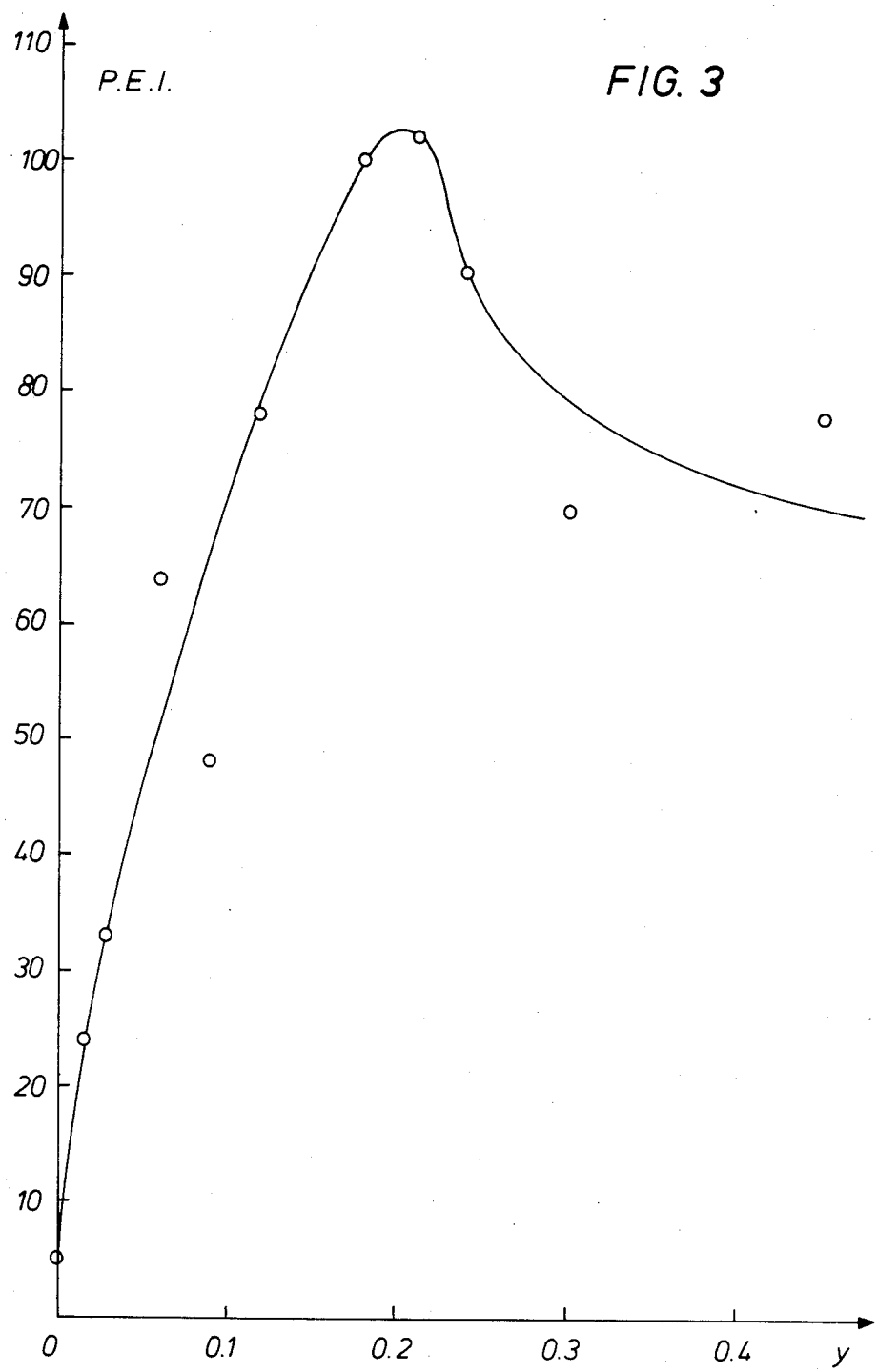
FIG. 3 represents a curve relating to percental emission intensity (P.E.I.) for the 542 nm emission band versus y value in Tb containing phosphors obtained according to Examples 1 to 11. The emission value of the phosphor prepared according to Example 1 being arbitrarily given the value 100.
Figure 4:
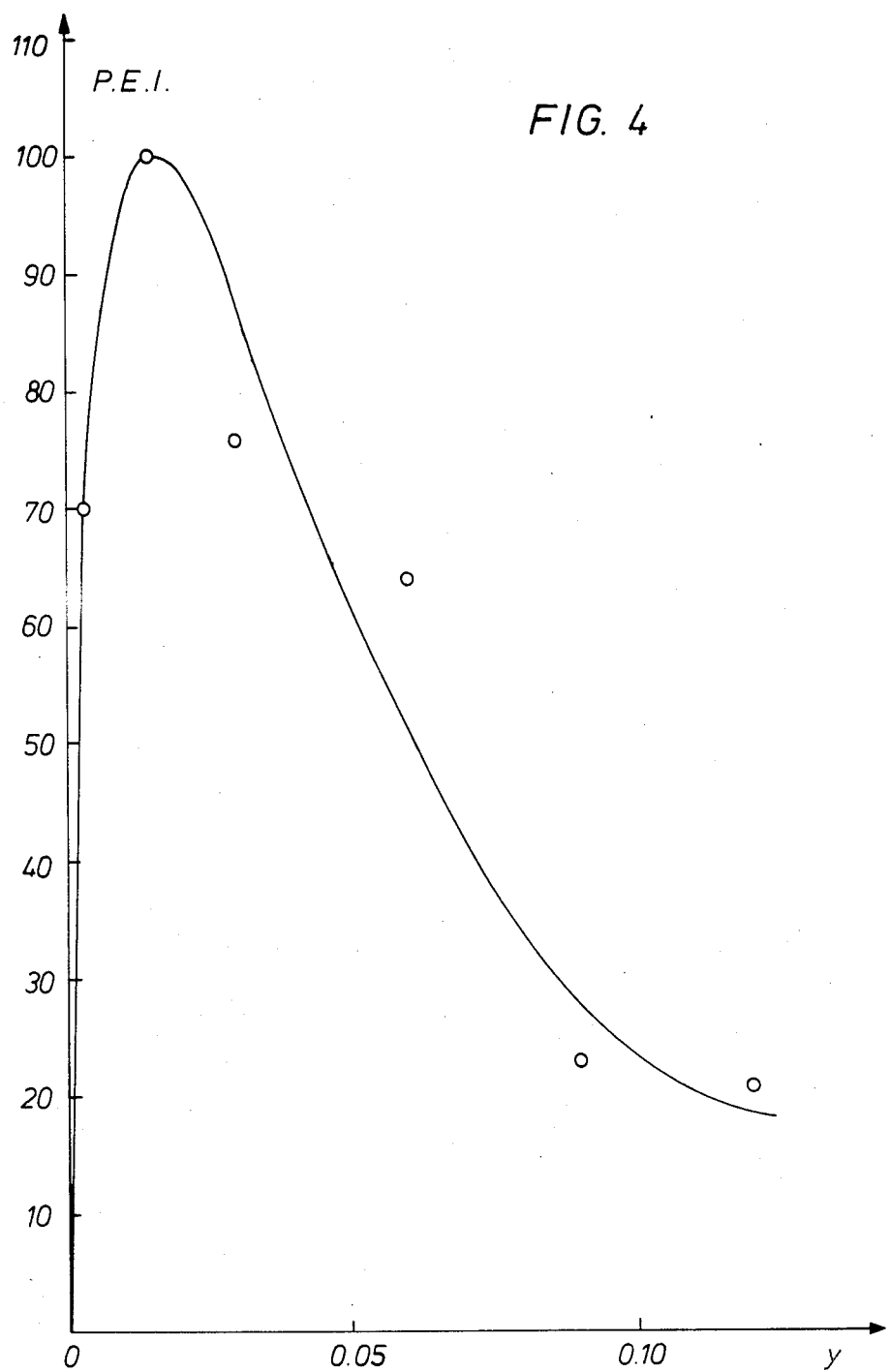
FIG. 4 represents a curve relating to percental emission intensity (P.E.I.) for emission at wavelengths below 478 nm versus y value in Tb containing phosphors according to Examples 2 to 7. The emission value of the phosphor prepared according to Example 3 being arbitrarily given the value 100.

FIG. 2 represents the relative energy (R.E.) versus wavelength (nm) curve, of the phosphor prepared according to Example 3. The excitation proceeded with X-rays of 100 kV.

TABLE 1

| Example No. | y | P.E.I. at Lambda < 478 nm | P.E.I. at 542 nm | $I_{383\ nm}$:$I_{542\ nm}$ |
|---|---|---|---|---|
| 2 | 0.003 | 70 | 5 | 8.11 |
| 3 | 0.015 | 100 | 24 | 2.77 |
| 4 | 0.029 | 76 | 33 | 1.30 |
| 5 | 0.058 | 64 | 64 | 0.56 |
| 6 | 0.087 | 23 | 48 | 0.27 |
| 7 | 0.116 | 21 | 78 | 0.16 |
| 1 | 0.176 | 13 | 100 | 0.073 |
| 8 | 0.203 | 9 | 102 | 0.050 |
| 9 | 0.232 | — | 90 | 0.038 |
| 10 | 0.290 | — | 70 | 0.018 |
| 11 | 0.435 | — | 78 | 0.017 |

EXAMPLE 12

2.51053 g of $Gd_2O_3$, 0.05349 g of $Tb_4O_7$ and 2.56035 g of GaOOH were dissolved in several hundred ml of concentrated hydrochloric acid whereupon the volume of the obtained solution was reduced to 50 ml. To that volume 100 ml of a 25 wt % aqueous solution of ammonia was added. The formed coprecipitate was washed, dried and fired in air for 1 h at 400° C. After grinding in a ball mill the mixture was further fired for 3 h in a nitrogen atmosphere at a temperature of 1000 ° C. After cooling the product was ground in a ball mill and finally fired for 2 to 3 h in a nitrogen/hydrogen (75/25 vol. ratio) atmosphere at 1100 ° C.

The phosphor consisted for almost 100 % of $Gd_{2.837}Tb_{0.059}Ga_{5.104}O_{12}$.

Under X-ray excitation said phosphor exhibited a 542 nm band emission of 20 % of that of example 1, compared with 64 % for the phosphor of example 5.

EXAMPLE 13

2.54897 g of $Gd_2O_3$, 0.01338 g of $Tb_4O_7$ and 2.56035 g of GaOOH were dissolved in several hundred ml of concentrated hydrochloric acid whereupon the volume of the obtained solution was reduced to 50 ml. To that volume 100 ml of a 25 wt % aqueous solution of ammonia was added. The formed coprecipitate was washed, dried and pre-fired in air for 1 h at 400° C. After grinding in a ball mill the mixture was further fired for 1 h in a nitrogen atmosphere at a temperature of 900 ° C.

After cooling the obtained phosphor consisted almost entirely of $Gd_{2.880}Tb_{0.015}Ga_{5.105}O_{12}$.

Under X-ray excitation this phosphor exhibited a 542 nm band emission of 17 % of that of example 1, compared with 24 % for the phosphor of example 3.

EXAMPLE 14

2.4084 g of $Gd_2O_3$, 0.1637 g of $Tb_4O_7$ and 2.5616 g of GaOOH were mixed for 10 min in a planetary ball mill in the presence of several ml of ethanol. The mixture in a compressed state was fired at 1550 ° C. in an air atmosphere for 17 h in an aluminum oxide crucible in a tube furnace. The produce consisted of 100 % of $Gd_{2.72}Tb_{0.18}Ga_{5.10}O_{12}$ with garnet structure.

Under X-ray excitation this phosphor exhibited a 542 nm band emission of 99 % of that of example 1.

EXAMPLE 15

Exactly the same procedure was followed as described in example 14 except that the firing was carried out in a nitrogen atmosphere. The product consisted of 100 % of $Gd_{2.72}Tb_{0.18}Ga_{5.10}O_{12}$ with garnet structure.

Under X-ray excitation this phosphor exhibited a 542 nm band emission of 123 % of that of example 1.

EXAMPLE 16

Step 1

90.625 g of $Gd_2O_3$ was dissolved in 150 ml of nitric acid and then diluted to 250 ml with distilled water giving a 2 M solution of $Gd(NO_3)_3$. 4.6730 g of $Tb_4O_7$ was dissolved in 100 ml of 65 wt % aqueous nitric acid solution and then diluted to 250 ml with distilled water giving a 0.1 M solution of $Tb(NO_3)_3$. 125 ml of the 2 M $Gd(NO_3)_3$ solution and 154.6 ml of the $Tb(NO_3)_3$ solution were mixed and heated to 60 ° C. The pH is this mixture was then adjusted to 3 with concentrated ammonium hydroxide and then 400 ml of oxalic acid were added dropwise with stirring. After filtration, washing and drying at 150 ° C. overnight a gadolinium oxalate doped with 6 atom % of terbium and containing 4.43 molecules of water in its crystal structure was obtained.

Step 2

7.80221 g of the above prepared terbium doped gadolinium oxalate was mixed for 10 min with 3.70207 g of $Ga_2O_3$ and 13 ml of ethanol in planetary ball mill.

One half of the obtained mixture was fired in compressed state at 1410 ° C. in an air atmosphere for 3 h in an aluminum oxide crucible in a tube furnace heated up at a rate of 300 ° C./h.

The product consisted of 100 % of $Gd_{2.82}Tb_{0.18}Ga_5O_{12}$ with garnet structure.

Under X-ray excitation this phosphor exhibited a 542 nm band emission of 171 % of that of example 1.

EXAMPLE 17

4.29801 g of the product obtained in Step 1 of example 16 pyrolyzed at 1100 ° C. for 35 h was mixed for 10 min with 3.70221 g of $Ga_2O_3$ and 13 ml of ethanol in a planetary ball mill.

One half of the obtained mixture was brought in compressed state and fired for 3 h at 1410 ° C. in an air atmosphere in an aluminium oxide crucible in a tube furnace heated up at a rate of 300 ° C./h.

The product consisted of 100 % of $Gd_{2.82}Tb_{0.18}Ga_5O_{12}$ with garnet structure.

Under X-ray excitation this phosphor exhibited a 542 nm band emission of 148 % of that of example 1.

EXAMPLE 18

4.43973 g of $Gd_2O_3$, 0.29581 g of $Tb_4O_7$ and 4.24533 g of $Ga_2O_3$ were mixed for 10 min with 11.65 ml of ethanol in a planetary ball mill.

The mixture was fired in a compressed state at 1550 ° C. in air for 3 h in an aluminium oxide crucible in a tube furnace heated up at a rate of 300 ° C./h.

The product consisted of 100 % of $Gd_{2.74}Tb_{0.18}Ga_{5.08}O_{12}$.

Under X-ray excitation this phosphur exhibited a 542 nm band emission of 115 % of that of example 1 (see Table 2).

EXAMPLES 19≅23

Following the procedure described in Example 18 phosphors with x being 5.19, 5.15, 5.11, 5.05 and 5.01 respectively were prepared.

The percental emission intensities (P.E.I.) of the 542 nm band are indicated in the following Table 2. The emission intensity of the phosphor prepared according to example 1 is given arbitrarily the value 100. See FIG. 5.

TABLE 2

| Example No. | y | x | P.E.I. at 542 nm |
|---|---|---|---|
| 19 | 0.17 | 5.19 | 54 |
| 20 | 0.17 | 5.15 | 65 |
| 21 | 0.18 | 5.11 | 72 |
| 1 | 0.18 | 5.10 | 100 |
| 18 | 0.18 | 5.08 | 108 |
| 22 | 0.18 | 5.05 | 76 |
| 23 | 0.19 | 5.01 | 73 |

EXAMPLE 24

2.02181 g of $Gd_2O_3$, 0.002156 g of $Tb_4O_7$ and 2.02383 g of GaOOH were mixed for 10 min with 4 ml of ethanol in a planetary ball mill.

The mixture was fired in compressed state at 1410 ° C. in air for 3 h in an aluminium oxide crucible in a tube furnace heated up at a rate of 300 ° C./h.

The product consisted of 100 % $Gd_{2.891}Tb_{0.003}Ga_{5.106}O_{12}$.

Under X-ray excitation this phosphor exhibited emission at wavelengths below 478 nm of 73 % of that of example 3 (see FIG. 6).

An X-ray conversion screen according to the present invention consists essentially of a phosphor dispersed in particulate form in a supported or self-supporting binder layer, wherein the binder is of organic nature and wherein said phosphor comprises a gadolinium gallium garnet compound having the following empirical formula:

$$Gd_{8-x-y}Ln_yGa_xO_{12}$$

wherein : $5.14 \geq x \geq 4.90$ and $0.45 \geq y \geq 0.001$, and Ln is scandium (Sc) and/or one or more rare earth elements other than gadolinium.

For use in the production of X-ray conversion screens according to the present invention the phosphor particles have preferably a size in the range of 0.1 to 20 μm, preferably in the range of 1 to 10 μm.

The grain size can be adjusted after firing and cooling by grinding, e.g. in a ball-mill.

The present invention includes a method for recording of information wherein the X-ray conversion screen according to the present invention is exposed imagewise to X-rays and the light emitted thereby is received by a photon-detection means, e.g. a photo-cathode emitting electrons when struck by visible light, a photoconductor obtaining increased electrical conductivity or a photochemical dectector, e.g. photosensitive silver halide grains making part of a photographic silver halide emulsion layer material for forming therein by development a visible image.

The screens of the present invention are particularly suited for use in the X-ray range which extends from about 50 keV to 150 keV.

Suitable binders for forming a binder layer incorporating said phosphors in dispersed form are film forming organic polymers, e.g., a cellulose acetate butyrate, polyalkyl (meth)acrylates, e.g. polymethyl methacrylate, a polyvinyl-n-butyral e.g. as described in the U.S. Pat. No. 3,043,710, a copoly(vinyl acetate/vinyl chloride) and a copoly(acrylonitrile/butadiene/styrene) or a copoly(vinyl) chloride/vinyl acetate/vinyl alcohol) or mixture thereof.

To provide high X-ray emission it is preferable that a minimum amount of binder be employed to form the X-ray conversion screen, so that the fluorescent layer of the screen substantially consists of phosphor particles dispersed in the binder. However, a very small amount of binding agent may result in a too brittle layer, so a compromise has to be made.

The thickness of a supported phosphor layer is preferably in the range of 0.05 to 0.5 mm.

The coverage of the phosphor is preferably in the range from about 300 to 750 g/m2.

For the preparation of the X-ray conversion screen, also called phosphor screen or fluorscent screen, the phosphor particles are intimately dispersed in a solution of the binder and then coated on a support and dried.

The coating of the present phosphor binder layer may proceed according to any usual technique, e.g. by spraying, dip-coating or doctor blade coating. After coating, the solvent(s) of the coating mixture is (are) removed by evaporation, e.g. by drying in an air current of 60° C.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per cm3 of dry coating).

In preparing an X-ray conversion screen according to the present invention the phosphor-binder composition may be coated on a wide variety of supports, e.g. cardboard and plastic film, e.g. polyethylene terephthalate film. The supports used in the fluorescent screens of the present invention may be coated with (a) subbing layer(s) for improving the adherence of the phosphor coating thereto.

Optionally, a light-reflecting layer is provided between the phosphor-containing layer and its support to enhance the light-output e.g. for exposure of a silver halide emulsion material. Such a light-reflecting layer may contain white pigment particles dispersed in a binder, e.g. titanium dioxide particles, or may be made of a vapour-deposited metal layer, e.g. an aluminium layer having a high reflection power for ultraviolet radiation and blue light.

The image sharpness obtainable with an imaging system consisting of a an X-ray conversion screen according to the present invention and a photographic silver halide material can be improved considerably by incorporating a fluorescent light-absorbing dye, called "screening dye", into the fluorescent screen material. As oblique radiation has a longer path in the screen material, it is attenuated by the screening dye or dyes to a greater extent than the radiation impinging normally. The term "screening dye" used herein includes dyestuffs (i.e. coloured substances in molecularly divided form) as well as pigments.

Diffuse radiation reflecting from the support of the X-ray conversion screen can be mainly attenuated in an anti-reflection layer containing the screening dyes subjacent to the phosphor layer.

The screening dye does not have to be removed from the screen and may therefore be any dye or pigment absorbing in the emission spectrum of the phosphor. Thus black substances such as carbon black particles of an average size of 0.15 to 0.60 $\mu$m incorporated in said anti-reflection layer to the phosphor layer yield quite satisfactory results.

To the phosphor layer a protective coating may be applied preferably having a thickness in the range of 5 to 25 $\mu$m and comprising a film-forming polymeric material that is photographically inert towards a silver halide emulsion layer.

Polymeric materials suitable for that purpose include e.g. cellulose derivatives (e.g. cellulose nitrate, cellulose triacetate, cellulose acetate propionate, cellulose acetate butyrate), polyamides, polystyrene, polylvinyl acetate, polyvinyl chloride, silicon resins, poly(acrylic ester) and poly(methacrylic ester) resins, and fluorinated hydrocarbon resins, and mixtures of the foregoing materials. Representative examples of various individual members of these binder materials include the following resinous materials : poly(methyl methacrylate), poly(n-butyl methacrylate), poly(isobutyl methacrylate), copolymers of n-butyl methacrylate and isobutyl methacrylate, copolymers of vinylidene fluoride and hexafluoropropylene, copolymers of vinylidene fluoride and trifluorochloroethylene, copolymers of vinylidene fluoride and tetrafluoroethylene, terpolymers of vinylidene fluoride, hexafluoropropylene, and tetrafluoroethylene, and poly(vinylidene fluoride).

According to a particular embodiment the protective layer is composed of a crosslinked polymer mass obtained by an acid-catalyzed reaction of a polymer or mixture of polymers containing reactive hydrogen atoms and a crosslinking agent, the crosslinking agent being e.g. an organic compound containing a plurality of etherified N-methylol groups.

According to a preferred embodiment the outer face of the screen intended for contact with a photographic silver halide emulsion material contains a solid particulate material that has a static friction coefficient ($\mu$) at room temperature (20° C.) of less than 0.50 on steel as described in the published German Patent Application No. 2,616,093.

Antistatic substances can be applied to the screen to reduce the risk of electrical potential differences resulting in sparking. For example, the screens are treated with the "ANTI-STAT" 6 spray, which leaves an odourless transparent antistatic deposit. ANTI-STAT is a trade name of Braun Laboratories Div. Bartt Chemical Co., Inc., Philadelphia, Pa., U.S.A.

The present X-ray conversion screens may contain the above defined gadolinium-gallium garnet phosphor paraticles in admixture with other phosphor particles, e.g. blue and/or green-light emitting phosphors, e.g. the oxysulphides of lanthanum, gadolinium or lutetium activated with trivalent terbium. The preparation of these phosphors proceeds e.g. as described in U.S. Pat. Nos. 3,418,246, 3,418,246, 3,418,247 and 3,515,675. X-ray conversion screens containing such phosphors are described in U.S. Pat. No. 3,725,704. Other phosphors having a strong green light emission are described in U.S. Pat. No. 3,617,743, e.g. LaOCl:0.05Tb and LaOBr:0.05Tb:0.005Ce (see FIG. 2b and FIG. 2c of said U.S. Pat. Specification).

A combination particularly suitable for radiography comprises two separate X-ray fluorescent screens and a photosensitive material comprising a suport with a silver halide emulsion layer coated on each surface of said support, wherein each of the fluorescent screens is arranged adjacent to one of the silver halide emulsion layers as described e.g. in U.S. Pat. No. 4,130,428. The silver halide emulsion layers are sensitized with spectral sensitizing dye(s) in such a way that the silver halide is sensitive to light in the wavelength range of 450–570 nm. The spectrally sensitized silverhalide may be present in each silver halide emulsion layer in an amount equivalent with a silver amount of less than 4 g per m2 without resulting in an objectionable "cross-over" and loss of image-sharpness as defined in said U.S. Pat. No. 4,130,428. In a particular useful X-ray recording technique a pair of the present X-ray image conversion screens is used in a cassette and placed in direct contact with a photographic silver halide emulsion film, which being double-side emulsion coated makes contact at each of its sides with one of said screens.

In order to exclude local defects in the form of developable centres in the silver halide film used in conjunction with an X-ray image conversion screen containing rare earth-metal phosphor particles including traces of radioactive elements, the screen may contain a light-diffusing layer or sheet, which contains numerous discrete light-scattering volumes of a substance or substances distributed at random in a binder medium or partially embedded therein, such volumes having a mean size not larger than 20 μm , said layer or sheet being located so that fluorescent light of said phosphor particles can penetrate therethrough and leave the screen. A screen containing said substance(s) is described in U.S. Pat. No. 4,149,083.

According to another embodiment the X-ray image conversion screen according to the present invention is used free-standing as fluoroscopic screen for visual inspection of the fluorescent light image emitted thereby under the influence of an image-wise X-ray irradiation.

According to still another embodiment the X-ray image conversion screen according to the present invention is used in an evacuated X-ray image intensifier tube in such a way as to allow the light emitted by the conversion screen to strike a photo-cathode producing photo-electrons that after having been accelerated are used to strike a cathode-ray luminescent screen.

The following example 25 illustrates the manufacture of an X-ray conversion screen according to the present invention. All parts, percentages and ratios are by weight unless otherwise stated.

EXAMPLE 25

A phosphor prepared according to Example 1 was dispersed in a ball mill in a 30 % solution of poly-n-butylmethacrylate as binder in toluene, the phosphor to binder ratio being 8 : 1.

Ball-milling was effected till a grind with fineness 7 NS measured with an Hedgman Grind Gage was obtained (see ASTM D 120 specifications). The average particle size of the phosphor particles in the final grind was 7 μm .

After filtration and deaeration, the dispersion was coated on a polyethylene terephthalate support at a phosphor coverage of 600 g per m2.

After drying the obtained X-ray conversion screen material was introduced as a pair of screens in a common X-ray cassette. The thus obtained cassette was used for the exposure of medical radiographic film that is double side coated with a green sensitized silver halide emulsion layer. Very satisfactory results from the viewpoint of image sharpness and speed where obtained on using the X-ray film described in Example 2 of U.S. Pat. No. 4,130,428.

We claim:

1. A process for the conversion of X-rays into blue and/or green light with a phosphor which on exposure to X-rays emits light the spectrum of which contains main intensity lines below 460 nm and/or main intensity lines between 530 and 570 nm, characterized in that said phosphor comprises a gadolinium gallium garnet compound having the following empirical formula:

$Gd_{8-x-y}Ln_yGa_xO_{12}$ wherein : $5.14 \geq x \geq 4.90$ and $0.45 \geq y \geq 0.001$, and Ln is scandium and/or one or more rare earth elements other than gadolinium.

2. A process according to claim 1, characterized in that x is in the range $5.12 \geq x \geq 4.95$ and Ln is at least 50 atom % of trivalent terbium.

3. A process according to claim 1, wherein Ln is $Tb^{3+}$, y is in the range $0.45 \geq y \geq 0.09$ and x is in the range $5.12 \geq x \geq 4.95$.

4. An X-ray conversion screen consisting essentially of a phosphor dispersed in particulate form in a supported or self-supporting binder layer, wherein the binder is of organic nature, characterized in that said phosphor comprises a gadolinium gallium garnet compouond having the following empirical formula:

$Gd_{8-x-y}Ln_yGa_xO_{12}$ wherein : $5.14 \geq x \geq 4.90$ and $0.45 \geq y \geq 0.001$, and Ln is scandium (Sc) and/or one or more rare earth elements other than gadolinium.

5. An X-ray conversion screen according to claim 4, wherein Ln is $Tb^{3+}$, y is in the range $0.45 \geq y \geq 0.09$ and x is in the range $5.12 \geq x \geq 4.95$.

6. An X-ray conversion screen according to claim 4, wherein the phosphor is in dispersed form in (a) film forming opganic polymer(s).

7. An X-ray conversion screen according to claim 4, wherein the phosphor in said layer is applied at a coverage in the range from 300 to 750 g/m2.

8. An X-ray conversion screen according to claim 4, wherein the phosphor has a particles size in the range of 0.1 to 20 μm.

* * * * *